United States Patent
Fujii et al.

(10) Patent No.: US 6,959,939 B2
(45) Date of Patent: Nov. 1, 2005

(54) ELECTRONIC BICYCLE SHIFT CONTROL DEVICE

(75) Inventors: Kazuhiro Fujii, Kawachinagano (JP); Kouji Uno, Osaka (JP)

(73) Assignee: Shimano, Inc., Sakai (JP)

( * ) Notice: Subject to any disclaimer, the term of this patent is extended or adjusted under 35 U.S.C. 154(b) by 97 days.

(21) Appl. No.: 10/179,564

(22) Filed: Jun. 24, 2002

(65) Prior Publication Data

US 2003/0001357 A1 Jan. 2, 2003

(30) Foreign Application Priority Data

Jun. 29, 2001 (JP) ........................................ 2001-198420

(51) Int. Cl.$^7$ ............................................. F16H 59/00
(52) U.S. Cl. .................... 280/238; 280/260; 280/288.4; 474/70
(58) Field of Search .............................. 280/260, 288.4, 280/238, 259; 180/65.3; 474/69, 70, 71, 78, 81; 701/55; 362/509, 473, 475, 474, 476, 464; 340/461, 459

(56) References Cited

U.S. PATENT DOCUMENTS

| | | | |
|---|---|---|---|
| 5,266,065 A | | 11/1993 | Restelli |
| 5,378,553 A | | 1/1995 | Shoji |
| 5,574,324 A | * | 11/1996 | Hirama et al. ............... 310/194 |
| 5,681,234 A | * | 10/1997 | Ethington .................... 474/70 |
| 5,690,410 A | * | 11/1997 | Lin ............................ 362/473 |
| 5,828,145 A | * | 10/1998 | Nakamura .................... 310/67 |
| 6,015,159 A | * | 1/2000 | Matsuo ........................ 280/238 |
| 6,017,140 A | * | 1/2000 | Chou .......................... 362/475 |
| 6,047,230 A | * | 4/2000 | Spencer et al. ................ 701/57 |
| 6,146,297 A | * | 11/2000 | Kimura ........................ 474/78 |
| 6,367,833 B1 | * | 4/2002 | Horiuchi ..................... 280/260 |
| 6,418,041 B1 | * | 7/2002 | Kitamura ..................... 363/125 |
| 6,453,262 B1 | * | 9/2002 | Kitamura ..................... 702/145 |

FOREIGN PATENT DOCUMENTS

| | | |
|---|---|---|
| JP | 53-020244 A | 2/1978 |
| JP | 5-077774 A | 3/1993 |
| JP | 8-133150 A | 5/1996 |
| JP | 8-175460 A | 7/1996 |
| JP | 8-228463 A | 9/1996 |
| JP | 9-76982 A | 3/1997 |
| JP | 10-081275 A | 3/1998 |
| JP | 11-070863 A | 3/1999 |
| JP | 11-129960 A | 5/1999 |
| JP | 11-301546 A | 11/1999 |
| JP | 11-301547 A | 11/1999 |
| JP | 2000-016363 A | 1/2000 |
| JP | 2000-289682 A | 10/2000 |
| JP | 2001-39380 A | 2/2001 |

* cited by examiner

*Primary Examiner*—Tony Winner
(74) *Attorney, Agent, or Firm*—James A. Deland (57) ABSTRACT

A bicycle shift control device is adapted to be mounted to a bicycle equipped with an alternating current generator and a shifting device having a plurality of speed steps. The shift control device includes a power storage unit adapted to store electrical power from the alternating current generator; a shift control element operatively coupled for receiving electrical power from the power storage unit and for providing shift control signals for controlling the operation of the shifting device; and a case adapted to be mounted to the bicycle, wherein the case houses both the power storage unit and the shift control element.

31 Claims, 8 Drawing Sheets

MODE 1

| | Speed 1 | Speed 2 | Speed 3 |
|---|---|---|---|
| UPSHIFT THRESHOLD (km/h) | 19.2 | 26.0 | |
| DOWNSHIFT THRESHOLD (km/h) | | 17.5 | 23.8 |

MODE 2

| | Speed 1 | Speed 2 | Speed 3 |
|---|---|---|---|
| UPSHIFT THRESHOLD (km/h) | 16.7 | 22.6 | |
| DOWNSHIFT THRESHOLD (km/h) | | 15.2 | 20.7 |

MODE 3

| | Speed 1 | Speed 2 | Speed 3 |
|---|---|---|---|
| UPSHIFT THRESHOLD (km/h) | 14.6 | 19.7 | |
| DOWNSHIFT THRESHOLD (km/h) | | 13.2 | 18.0 |

MODE 4

| | Speed 1 | Speed 2 | Speed 3 |
|---|---|---|---|
| UPSHIFT THRESHOLD (km/h) | 12.7 | 17.1 | |
| DOWNSHIFT THRESHOLD (km/h) | | 11.5 | 15.6 |

MODE 5

| | Speed 1 | Speed 2 | Speed 3 |
|---|---|---|---|
| UPSHIFT THRESHOLD (km/h) | 11.0 | 14.9 | |
| DOWNSHIFT THRESHOLD (km/h) | | 10.0 | 13.6 |

MODE 6

| | Speed 1 | Speed 2 | Speed 3 |
|---|---|---|---|
| UPSHIFT THRESHOLD (km/h) | 9.6 | 12.9 | |
| DOWNSHIFT THRESHOLD (km/h) | | 8.7 | 11.8 |

MODE 7

| | Speed 1 | Speed 2 | Speed 3 |
|---|---|---|---|
| UPSHIFT THRESHOLD (km/h) | 8.3 | 11.2 | |
| DOWNSHIFT THRESHOLD (km/h) | | 7.6 | 10.3 |

ELECTRONIC BICYCLE SHIFT CONTROL DEVICE

BACKGROUND OF THE INVENTION

The present invention is directed to bicycles and, more particularly, to an electronic shift control device for a bicycle transmission.

Bicycle transmissions include internal transmissions and external transmissions. Internal transmissions ordinarily include a planetary gear mechanism fitted in the rear wheel hub. External transmissions ordinarily have a multiple sprocket cassette mounted on the rear wheel hub or crank, and a derailleur guides a chain among the multiple sprockets. In either case, a shift control cable is connected to the transmission and to a manually operated shift controller mounted to the bicycle frame, and the rider operates the shift controller to select a desired transmission gear.

Recently, automatic bicycle transmissions have been developed which automatically shift the transmission to higher gear ratios when the bicycle is traveling at high speeds and which automatically shift the transmission to lower gear ratios when the bicycle is traveling at low speeds. Such automatic transmissions usually are equipped with an electric motor for operating the shift control cable, a speed sensor for sensing bicycle speed, a control element containing a microcomputer for controlling the electric motor in response to bicycle speed, and a case mounted to the bicycle frame for containing these components.

Dry cells and other primary cells, or nickel-cadmium and other secondary batteries, are used to supply power to the electric motor, control element, etc. Depending on the frequency of shifting, battery consumption may be heavy due to the relatively high power consumption of the electric motor. Batteries must be replaced or recharged when consumed, thus requiring time-consuming operations for the replacement or recharging. Another drawback is the need to constantly check remaining battery power and prepare reserve batteries, since shifting cannot be performed once the batteries are consumed.

The speed sensor ordinarily is mounted for detecting the passage of a magnet attached to the bicycle wheel, and a speed signal pulse is communicated to the control element for each wheel rotation. The control element shifts the bicycle transmission in response to the speed signal pulses. Since the speed sensor outputs one pulse per wheel revolution, the calculated bicycle speed and the actual bicycle speed may differ by up to one wheel rotation. Since the control unit operates in response to these speed signals, there is a delayed response that can make high-precision shifting control impossible. Furthermore, if the speed sensor is mounted in the case together with the other components, then the case must be disposed near the bicycle wheel, thus limiting possible device mounting positions.

SUMMARY OF THE INVENTION

The present invention is directed to an electronically controlled bicycle transmission that is superior to known electronically controlled bicycle transmissions. In one embodiment of the present invention, a bicycle shift control device is adapted to be mounted to a bicycle equipped with an alternating current generator and a shifting device having a plurality of speed steps. The shift control device includes a power storage unit adapted to store electrical power from the alternating current generator; a shift control element operatively coupled for receiving electrical power from the power storage unit and for providing shift control signals for controlling the operation of the shifting device; and a case adapted to be mounted to the bicycle, wherein the case houses both the power storage unit and the shift control element.

In a more specific embodiment, a wave shaping circuit may be provided that converts a signal from the alternating current generator to a speed signal, wherein the shift control element provides the shift control signals in response to the speed signal. Since speed signals derived from the generator can be produced more than once per wheel revolution, the shift control element can operate with greater precision than known shift control elements.

Other components may be mounted within the case to take advantage of the power supplied by the generator. For example, a lamp a lamp control circuit and/or a light sensor may be mounted in the case, alone or in any combination, and the shift control element may operate with all such components. A display may be provided to display various operating parameters. A mode selection switch may be provided to select among various operating modes, and manual shift switches or other components may be provided to allow manual operation of the shift control element and other functions. If desired, such additional components may be housed separately from the case.

DETAILED DESCRIPTION OF THE EMBODIMENTS

Figure 1:
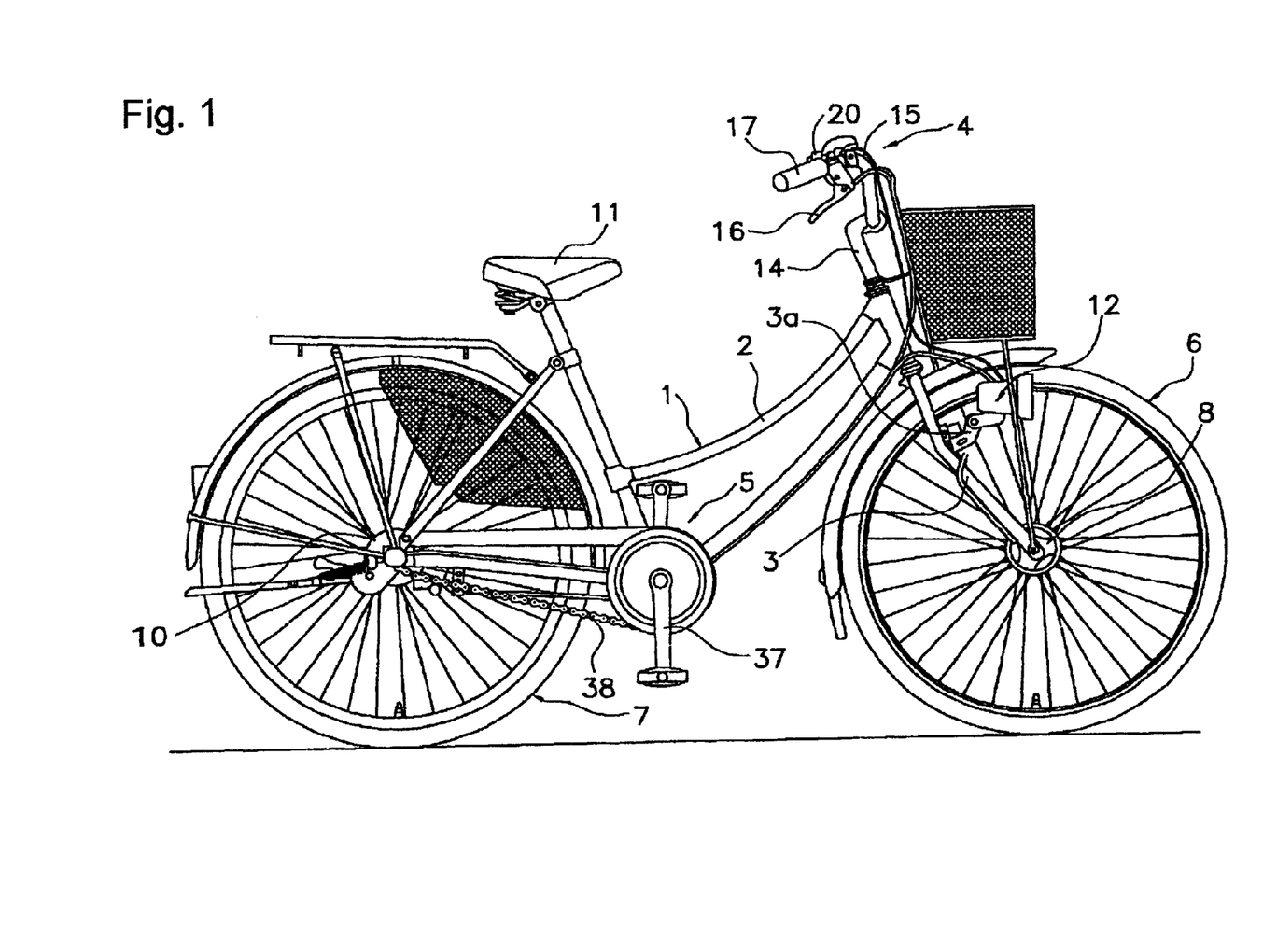
FIG. 1 is a side view of a bicycle that includes a particular embodiment of an electronic bicycle transmission according to the present invention.

FIG. 1 is a side view of a bicycle that includes a particular embodiment of an electronic bicycle transmission according to the present invention. This bicycle is a recreational bicycle comprising a frame 1 having a double-loop frame body 2 formed from welded tubes, a front fork 3 rotatably mounted to the frame body 2, a handle component 4, a drive component 5, a front wheel 6 on which a dynamo hub 8 with brakes is mounted, a rear wheel 7 on which an internal shifting hub 10 is mounted, a saddle 11, a shift control unit 12 to control shifting of the internal shifting hub 10, and a shift controller 20 for manually operating the shift control unit 12.

Figure 2:
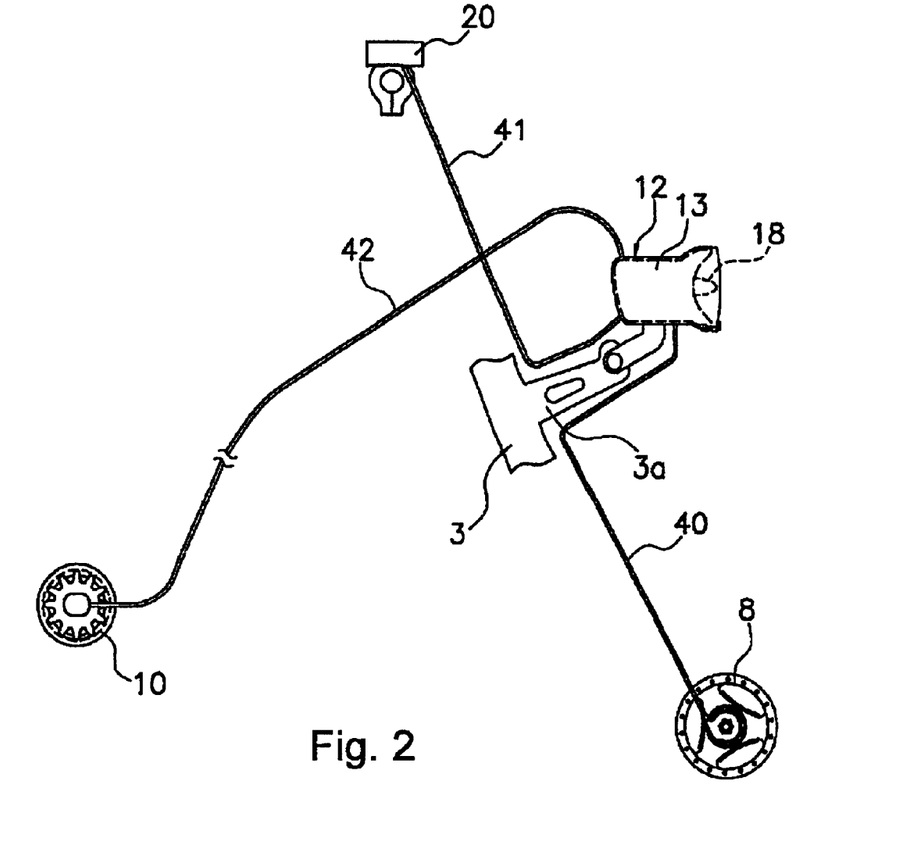
FIG. 2 illustrates how the shift controller, the shift control unit, the generator and the transmission are coupled together.

The handle component 4 comprises a handle stem 14, fastened to the upper part of the front fork 3, and a handlebar 15 fastened to the handle stem 14. Brake levers 16 and grips 17 are mounted on both ends of the handlebar 15. In this embodiment, the shift controller 20 is integrated with the right-side brake lever 16. The drive component 5 comprises a crank 37, mounted on the lower part (bottom bracket component) of the frame body 2, and a chain 38 that engages the crank 37 and the internal shifting hub 10. The internal shifting hub 10 is capable of producing three speed steps, including a low speed step (speed 1), an intermediate speed step (speed 2), and a high speed step (speed 3). These three speed steps can be selected by means of a motor unit 29 (FIG. 3) in the shift control unit 12. The dynamo hub 8 of the front wheel 6 can be fitted with a roller-type front brake, and it houses an alternating current generator 19 (FIG. 6) that generates electricity in response to the rotation of the front wheel 6. As shown in FIG. 2, the shift control unit 12 is electrically connected to the alternating current generator 19 housed in the dynamo hub 8 by electrical wiring 40, and it is electrically connected to the shift controller 20 by electrical wiring 41. The shift control unit 12 is mechanically connected to the internal shifting hub 10 by a shift control cable 42.

Figure 3:
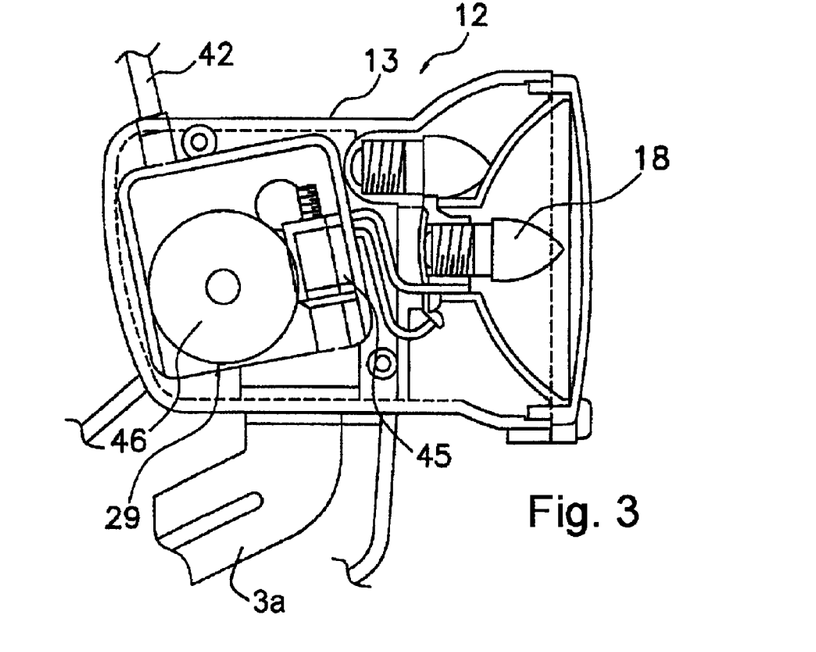
FIG. 3 is a side cross sectional view of the shift control unit shown in FIG. 2.
Figure 4:
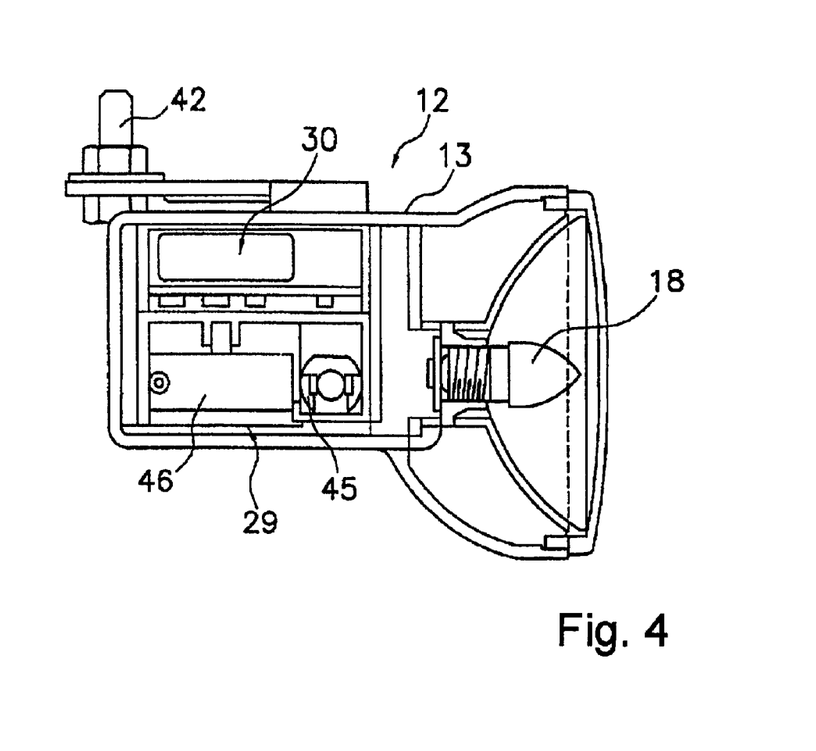
FIG. 4 is a top cross sectional view of the shift control unit shown in FIG. 2.

As shown in FIGS. 3 and 4, the shift control unit 12 comprises a lamp case 13 mounted to a lamp stay 3a located midway along the front fork 3 for housing a lamp 18. The motor unit 29 and a circuit unit 30 are housed in the lamp case 13. The motor unit 29 comprises a shifting motor 45, a cable operating component 46 which moves into three shifting positions by means of the shifting motor 45, and a position sensor 47 (FIG. 6) to detect the shift position of the cable operating component 46. One end of the shift control cable 42 is connected to this cable operating component 46. This arrangement facilitates waterproof construction, since no electrical wires are needed between the shift control unit 12 and the internal shifting hub 10 or lamp 18. Furthermore, all of these components are mounted to the front of the bicycle, where they do not interfere with riding. The circuit unit 30 comprises a shift control element 25 (FIG. 6) containing a microcomputer comprising a CPU, RAM, ROM, and an I/O interface.

Figure 5:
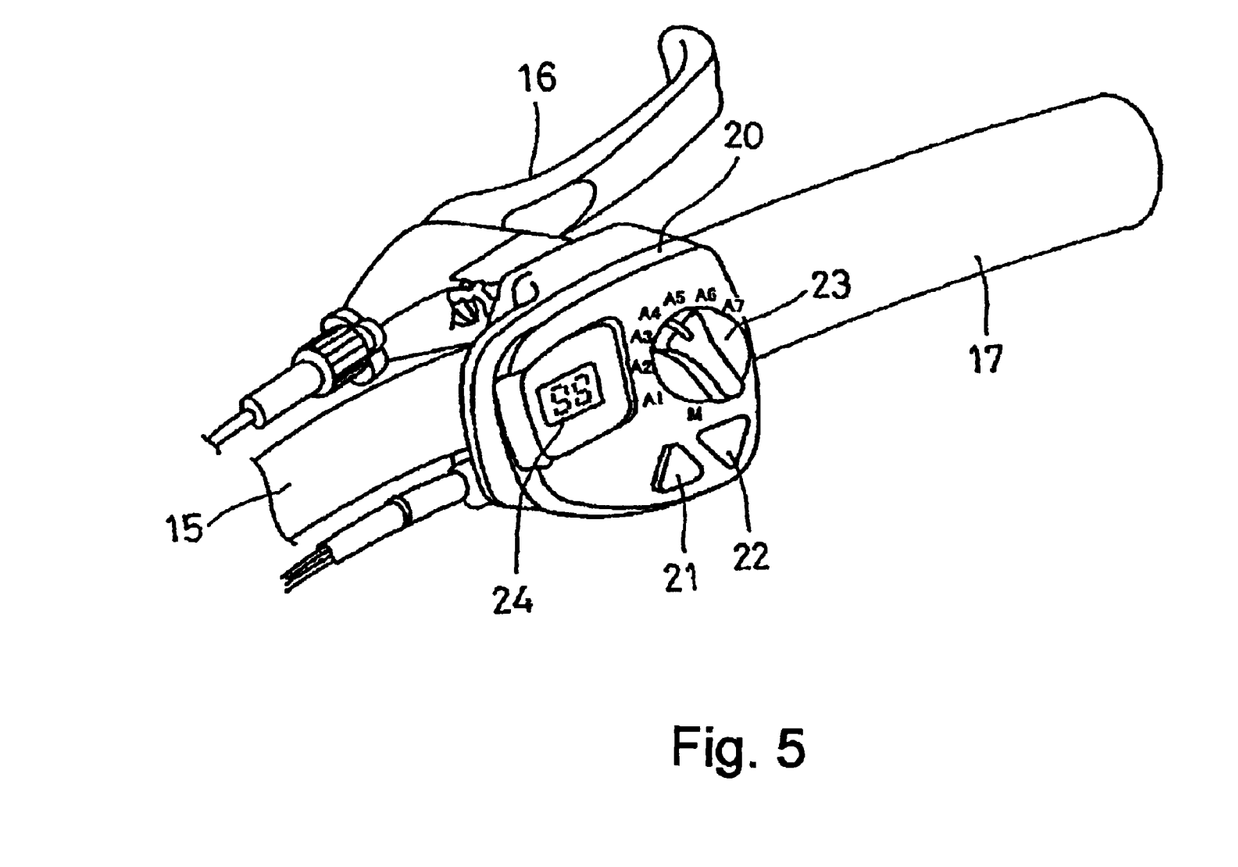
FIG. 5 is a perspective view of the shift controller.

As shown in FIG. 5, the shift controller 20 comprises two operating buttons 21 and 22 in the form of triangular pushbuttons disposed next to each other, an operating dial 23 disposed above the operating buttons 21 and 22, and a liquid crystal display component 24 disposed to the left of the operating dial 23. The operating button 21 on the left side is for manually shifting from the low speed step to the intermediate speed step and to the high speed step. The operating button 22 on the right side is for manually shifting from the high speed step to the intermediate speed step and to the low speed step. The operating dial 23 is used for switching between a manual mode (M) and seven automatic shifting modes (A1–A7) using eight detent positions.

Figure 7:
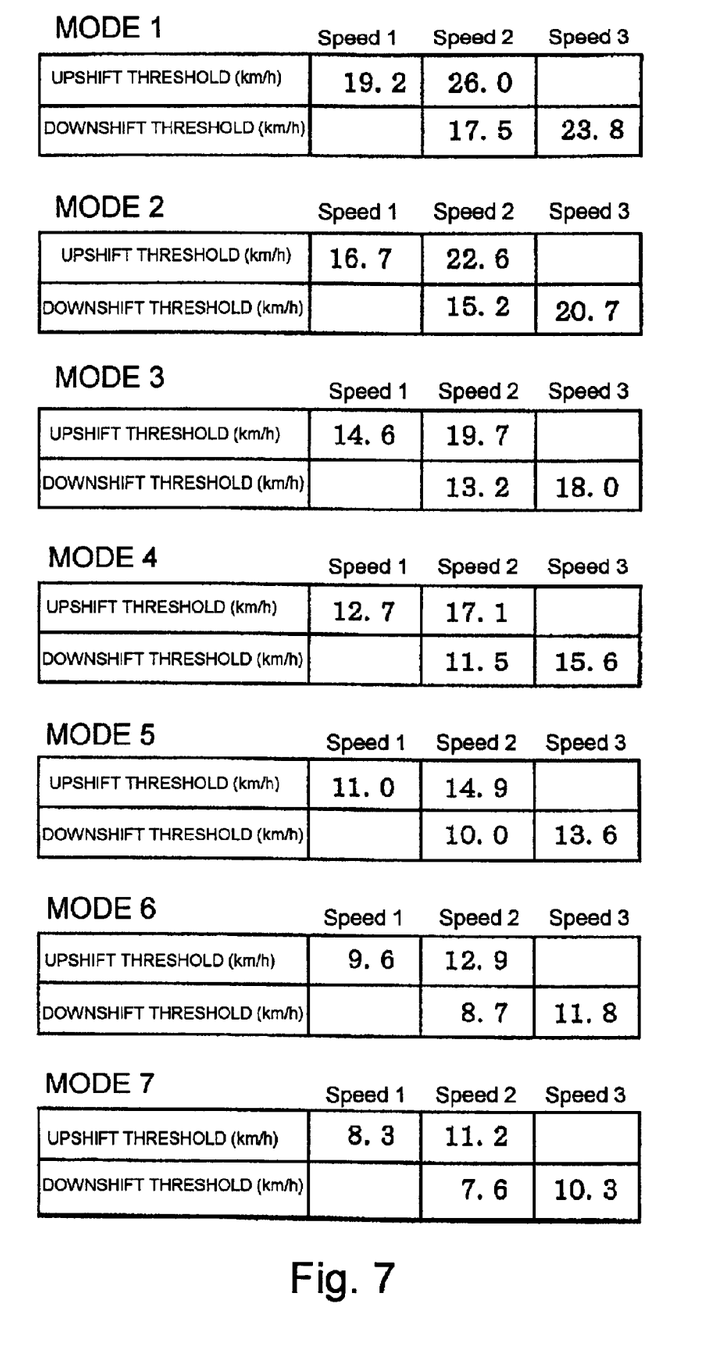
FIG. 7 is a series of tables showing the shifting characteristics for various automatic shifting modes.

The seven automatic shifting modes A1–A7 are modes for automatically shifting the internal shifting hub 10 according to a bicycle speed signal derived from the alternating current generator 19 in a manner described below. The seven automatic shifting modes are designed to allow shift timing (i.e., the speed at which shifting will occur) to be automatically changed during upshifting (shifting from low speed to high speed) or downshifting (shifting from high speed to low speed). The shift timings for the various modes are shown in FIG. 7. The upward and downward shift timings gradually decrease from mode 1 through mode 7 such that mode 1 shifts at the highest speed, and mode 7 shifts at the lowest speed. It is usually preferable to set the shift controller to about mode 4. For climbing hills, a mode may be set according to the steepness of the hill. When automatic shifting mode 4 is selected, for example, the hub is upshifted from speed 1 to speed 2 when the bicycle speed reaches 12.7 km/h. Similarly, the hub is upshifted to speed 3 when the bicycle speed reaches 17.1 km/h. On the other hand, when the bicycle speed later falls to 15.6 km/h, the hub is downshifted to speed 2, and again downshifted to speed 1 when the bicycle speed falls to 11.5 km/h. Between upshift timing and downshift timing, downshift timing is set as the lower of the two to prevent chattering during shifting.

Figure 6:
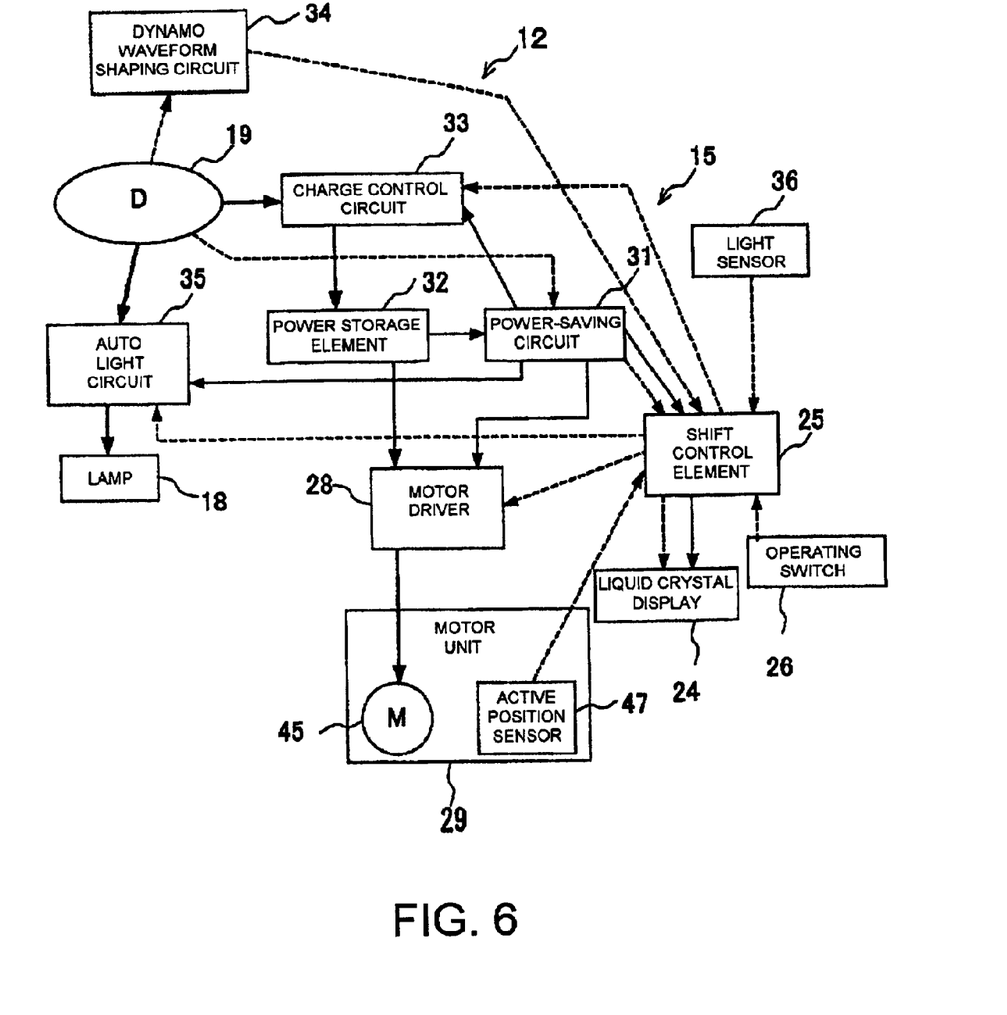
FIG. 6 is a schematic block diagram of the shift control device.

FIG. 6 is a block diagram illustrating the structure of the shift control device. Heavy lines in FIG. 6 indicate lines carrying about 1 A of current, solid lines indicate lines carrying about 5 mA of current, and dotted lines indicate signal lines. Shift control element 25 is operatively coupled to an operating switch 26 (which schematically represents the operating dial 23 and operating buttons 21 and 22 in the shift controller 20), to the liquid crystal display component 24, to a light sensor 36 (illumination sensor) for controlling the lamp 18, to a dynamo waveform shaping circuit 34 that generates a speed signal derived from the output of the alternating current generator 19, to a motor driver 28, to the active position sensor 47 of the motor unit 29, and to other input/output components.

Shift control element 25 automatically controls shifting of the internal shifting hub 10 according to travel speed, and it controls the information displayed on the liquid crystal display component 24 disposed in the shift controller 20. In this embodiment, the current travel speed and the speed step activated during shifting are displayed together on the liquid crystal display component 24. The shift control element 25 also controls the lamp 18 by turning it on when surrounding light conditions fall below a certain prescribed brightness, and by turning it off when surrounding light conditions are above the prescribed brightness.

A charge control circuit 33, a power storage element 32, and an auto light circuit 35 are operatively coupled to the shift control element 25 via a power-saving circuit 31. A signal from the alternating current generator 19 is input to the power-saving circuit 31, and it is determined based on this signal whether or not the bicycle is stopped. The power saving circuit 31 supplies the shift control element 25, the motor driver 28, the charge control circuit 33 and the auto light circuit 35 with electrical power stored by the power storage element 32 when the bicycle is moving for the normal operation of these components, and it interrupts the supply of electrical power to these components when the bicycle is stopped to avoid needless expenditure of electrical power stored by the power storage element 32. Motor driver 28 operates on a 1 mA current supplied by the power-saving circuit 31, and it controls a 1 A current supplied by the power storage element 32 to operate the shifting motor 45.

The charge control circuit 33 comprises, for example, a half-wave rectifier circuit that rectifies an alternating current output from the alternating current generator 19 to, for example, 1 A and 5 mA direct currents. The power storage element 32 comprises, for example, a high-capacity capacitor that stores the direct current power that is output from the charge control circuit 33. The power storage element 32 also may comprise secondary batteries such as nickel cadmium batteries, lithium ion batteries, nickel-metal hydride batteries, etc., in lieu of a capacitor.

The dynamo waveform shaping circuit 34 forms a speed signal from the alternating current output from the alternating current generator 19. More specifically, a half-cycle is extracted from a sine wave alternating current signal, passed through a Schmitt circuit or other appropriate waveform shaping circuit, and formed into a pulse signal corresponding to speed. Shift control element 25 uses this signal to control the automatic shifting of the internal shifting hub 10.

The auto light circuit 35 supplies or interrupts the 1 A current output from the alternating current generator 19 to the lamp 18 in response to on/off signal output from the shift control element 25. Shift control element 25 generates these signal based on the signals from the light sensor 36 in such a manner that the lamp 18 is switched on automatically when light levels fall below a prescribed limit, and it is switched off when light levels exceed the prescribed limit. In this embodiment, lamp 18 is operated from the alternating current generator 19 so that the current draw is less apt to adversely affect the power storage element 32, but this is not necessary.

Battery replacement and recharging are unnecessary because the power storage element 32 stores electrical power from the alternating current generator 19, and components such as the shift control element 25 are operated using this electrical power. Monitoring remaining battery power and carrying along spare batteries also become unnecessary, and shifting can be done automatically without performing the cumbersome procedures required by conventional power sources. The electrical power from the alternating current generator 19, which conventionally is not employed in the daytime, can be put to effective use in the shift control unit 12.

In addition, bicycle speed is detected based on the alternating current signal output from the alternating current generator 19, and shifting is controlled according to the detected bicycle speed. Because alternating current generators generally have a plurality of circumferentially disposed magnetic poles, the alternating current generator outputs an alternating current signal with a frequency related to the bicycle speed and the number of magnetic poles. Consequently, it is possible to obtain a larger number of signal pulses from the alternating current signal during each wheel rotation in comparison with a speed signal obtainable, for example, from a conventional speed sensor that detects a magnet mounted to the bicycle wheel. Therefore, the bicycle speed can be accurately detected within the space of one wheel rotation, and shifting can be controlled in real time with high precision. Furthermore, since shifting is controlled based on the alternating current signal from the alternating current generator 19, it is no longer necessary to dispose the shift control unit 12 in the vicinity of the bicycle wheel. No limitation is placed on the mounting position of the shift control unit 12.

Figure 8:
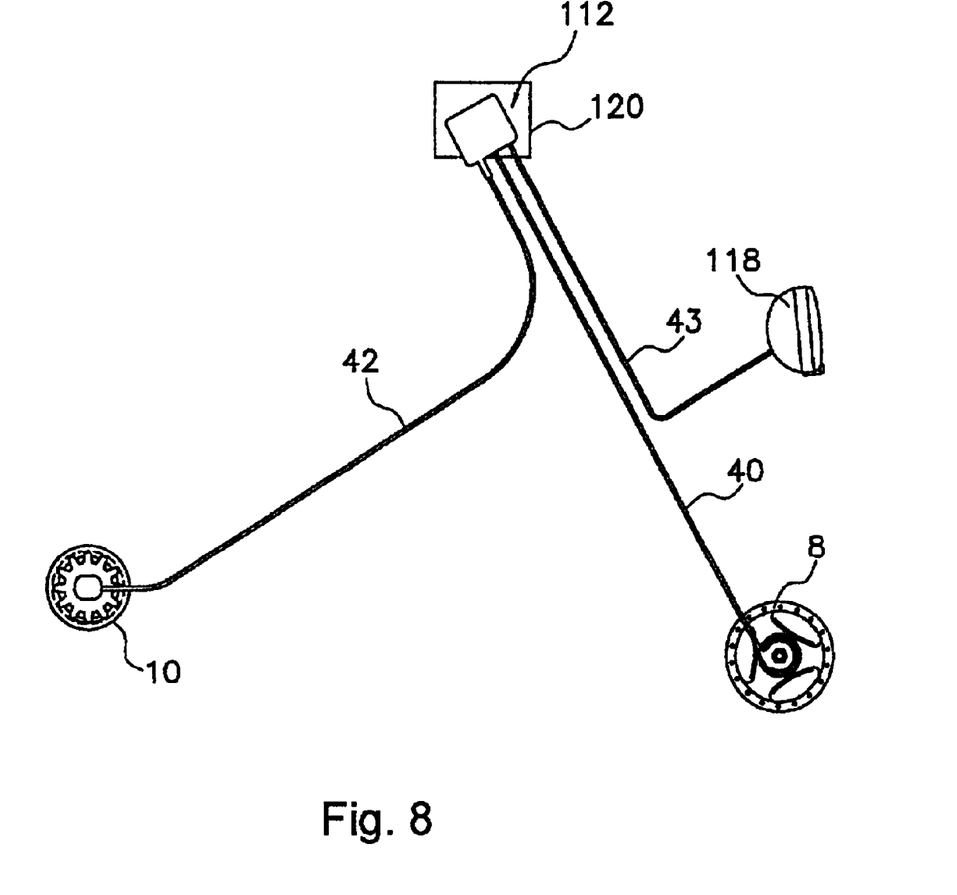
FIG. 8 illustrates how the shift controller, the shift control unit, the generator and the transmission are coupled together in another embodiment of the present invention.
Figure 9:
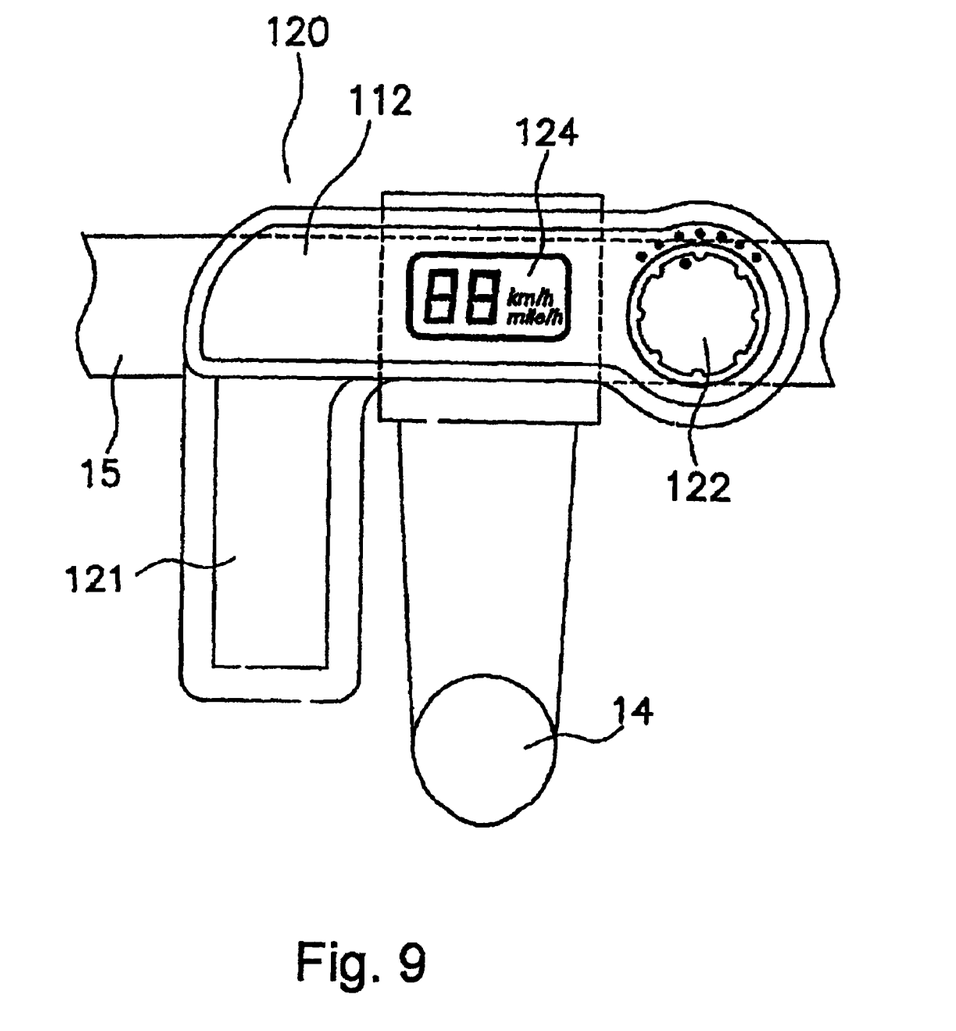
FIG. 9 is a plan view of the shift controller and shift control unit shown in FIG. 8.

While the above is a description of various embodiments of the present invention, further modifications may be employed without departing from the spirit and scope of the present invention. For example, the shift control unit 12 in the above embodiment was constructed using the lamp case 13, but as depicted in FIGS. 8 and 9, a shift control unit 112 may also be constructed using a case 121 of a shift controller 120. In this instance, a lamp 118 and shift control unit 112 may be connected using electrical wiring 43. In this embodiment, the case 121 is mounted on handlebar 15 in the vicinity of the handle stem 14, and a display component 124 and an operating dial 122 are positioned such that they are exposed to the outside. Circuit units and motor units are housed internally. In this embodiment, a currently existing lamp can be used as the lamp 118, and a unit for automatic shifting can be mounted as a modification to an existing three speed bicycle.

A shift controller was included in the aforementioned embodiments, but the shift controller may be omitted in some applications. For example, torque acting on the crank could be detected, and an automatic shifting mode could be selected automatically from among a plurality of modes according to the relationship between the torque and bicycle speed. Also, a single automatic shifting mode could be established.

A motor unit for shifting was placed within the shift control unit in the aforementioned embodiments. However, if desired a shifting motor, an active position sensor, or another motor unit may be disposed facing the shifting device. In such a case, the shift control element and the shifting device may be connected merely by using electrical wiring rather than a shift control cable.

Electrical power from an alternating current generator with high generating efficiency and low running resistance in a dynamo hub 8 was used in the aforementioned embodiments. However, if desired, electrical power generated by an alternating current generator in contact with the bicycle rim or tire may also be used.

An internal shifting hub was controllably shifted in the aforementioned embodiments, but the shifting device need not be mounted internally. The shifting device could comprise a derailleur, such as a front and/or rear derailleur. If desired, two motor units may be used for controlling each derailleur.

If desired, the display 24 may be omitted. The size, shape, location or orientation of the various components may be changed as desired. Components that are shown directly connected or contacting each other may have intermediate structures disposed between them. The functions of one element may be performed by two, and vice versa. The structures and functions of one embodiment may be adopted in another embodiment. It is not necessary for all advantages to be present in a particular embodiment at the same time. Every feature that is unique from the prior art, alone or in combination with other features, also should be considered a separate description of further inventions by the applicant, including the structural and/or functional concepts embodied by such feature(s). Thus, the scope of the invention should not be limited by the specific structures disclosed or the apparent initial focus on a particular structure or feature.

What is claimed is:

1. A bicycle shift control device adapted to be mounted to a bicycle equipped with an alternating current generator and a shifting device having a plurality of speed steps, wherein the shift control device comprises:
   a power storage unit adapted to store electrical power from the alternating current generator;
   a shift control element operatively coupled for receiving electrical power from the power storage unit and for providing shift control signals for controlling the operation of the shifting device;
   a wave shaping circuit that converts a signal from the alternating current generator to a speed signal, wherein the shift control element provides the shift control signals in response to the speed signal; and
   a case adapted to be mounted to the bicycle, wherein the case houses both the power storage unit and the shift control element.

2. The device according to claim 1 wherein the power storage unit comprises a capacitor.

3. The device according to claim 1 further comprising a display, wherein the shift control element displays a bicycle speed on the display in response to the speed signal.

4. The device according to claim 1 further comprising a motor driver circuit operatively coupled for receiving the shift control signals from the shift control element.

5. The device according to claim 4 wherein the motor driver circuit is housed within the case.

6. The device according to claim 4 further comprising an electric motor operatively coupled to the motor driver circuit for controlling the shifting device in response to signals from the motor driver circuit.

7. The device according to claim 6 wherein the motor driver circuit and the electric motor both are housed within the case.

8. The device according to claim 1 wherein the shift control element is programmed to operate in a plurality of automatic shift modes wherein, in each automatic shift mode, signals are provided to automatically operate the shifting device in response to predetermined parameters.

9. The device according to claim 8 further comprising a manually operated mode selector operatively coupled to the shift control element for selecting among the plurality of automatic shift modes.

10. The device according to claim 9 further comprising a manually operated shift selector operatively coupled to the shift control element for manually commanding the operation of the shifting device.

11. The device according to claim 10 wherein the mode selector and the shift selector are housed separately form the shift control element.

12. The device according to claim 1 wherein the power storage unit comprises a battery.

13. A bicycle shift control device adapted to be mounted to a bicycle equipped with an alternating current generator and a shifting device having a plurality of speed steps, wherein the shift control device comprises:

a power storage unit adapted to store electrical power from the alternating current generator;

a shift control element operatively coupled for receiving electrical power from the power storage unit and for providing shift control signals for controlling the operation of the shifting device;

a case adapted to be mounted to the bicycle, wherein the case houses both the power storage unit and the shift control element; and a lamp housed within the case.

14. The device according to claim 13 wherein the lamp is adapted to receive electrical power from the alternating current generator.

15. The device according to claim 14 further comprising a lamp control circuit for controlling the operation of the lamp.

16. The device according to claim 15 wherein the lamp control circuit is housed within the case.

17. The device according to claim 15 further comprising a light sensor for providing signals for controlling the operation of the lamp in response to ambient light.

18. The device according to claim 17 wherein the lamp control circuit and the light sensor both are housed within the case.

19. The device according to claim 17 wherein the shift control element is operatively coupled to the light sensor and to the lamp control circuit for providing signals to the lamp control circuit in response to signals from the light sensor.

20. A bicycle shift control device adapted to be mounted to a bicycle equipped with an alternating current generator and a shifting device having a plurality of speed steps, wherein the shift control device comprises:

a power storage unit adapted to store electrical power from the alternating current generator;

a shift control element operatively coupled for receiving electrical power from the power storage unit and for providing shift control signals for controlling the operation of the shifting device;

a case adapted to be mounted to the bicycle, wherein the case houses both the power storage unit and the shift control element;

a lamp;

a lamp control circuit operatively coupled to the lamp and to the shift control element to control the operation of the lamp in response to signals from the shift control element;

a light sensor, wherein the lamp control circuit controls the operation of the lamp in response to signals from the light sensor; and wherein the shift control element is operatively coupled to the light sensor and to the lamp control circuit for providing signals to the lamp control circuit in response to signals from the light sensor.

21. The device according to claim 20 wherein the lamp control circuit and the light sensor both are housed within the case.

22. A bicycle computer comprising:

a case adapted to be mounted to the bicycle;

a computer housed within the case, wherein the computer outputs signals to operate an electrically operated bicycle transmission; and a lamp housed within the case, wherein the lamp is controlled by the computer.

23. The computer according to claim 22 further comprising a display housed within the case, wherein the computer controls the information provided on the display.

24. The computer according to claim 23 further comprising a power storage unit that provides power for operating the lamp.

25. The computer according to claim 24 wherein the power storage unit is housed within the case.

26. The computer according to claim 24 wherein The power storage unit is adapted to store power from an alternating current generator.

27. The computer according to claim 24 wherein the power storage unit is housed within the case, and wherein the power storage unit is adapted to store power from an alternating current generator.

28. The computer according to claim 22 further comprising a light sensor coupled to the computer for controlling the operation of the lamp.

29. The computer according to claim 28 wherein the light sensor is housed within the case.

30. The computer according to claim 22 wherein the computer is adapted to process pulsed signals received from an alternating current generator.

31. The computer according to claim 30 further comprising a power storage unit housed within the case, wherein the power storage unit is adapted to store power from the alternating current generator.

* * * * *